United States Patent
Ma et al.

(10) Patent No.: US 12,204,070 B2
(45) Date of Patent: Jan. 21, 2025

(54) METHOD FOR ANALYZING SIGNAL IRREGULARITY OF RADIATION IN LIGHTNING LEADER

(71) Applicants: Nantong University, Jiangsu (CN); Institute of Atmospheric Physics, Chinese Academy of Sciences, Beijing (CN)

(72) Inventors: Zilong Ma, Nantong (CN); Rubin Jiang, Nantong (CN); Xiushu Qie, Nantong (CN); Hongyan Xing, Nantong (CN); Hongbo Zhang, Nantong (CN)

(73) Assignees: Nantong University (CN); Institute of Atmospheric Physics, Chinese Academy of Sciences (CN)

( * ) Notice: Subject to any disclaimer, the term of this patent is extended or adjusted under 35 U.S.C. 154(b) by 323 days.

(21) Appl. No.: 17/841,579

(22) Filed: Jun. 15, 2022

(65) Prior Publication Data

US 2023/0124543 A1   Apr. 20, 2023

(30) Foreign Application Priority Data

Oct. 15, 2021   (CN) .......................... 202111205567.9

(51) Int. Cl.
*G01W 1/16*   (2006.01)

(52) U.S. Cl.
CPC .......... *G01W 1/16* (2013.01); *G06F 2218/16* (2023.01)

(58) Field of Classification Search
CPC .......... G01W 1/16; G01W 1/10; G01W 1/02; G01W 2203/00; G06F 2218/16
See application file for complete search history.

(56) References Cited

U.S. PATENT DOCUMENTS

| | | | | |
|---|---|---|---|---|
| 6,791,311 B2* | 9/2004 | Murphy | ............. | G01R 29/0842 324/72 |
| 7,672,783 B2* | 3/2010 | Oettinger | ........... | G01R 29/0842 73/170.24 |
| 7,809,507 B2* | 10/2010 | Dwyer | .................... | G01W 1/16 324/72 |
| 8,836,518 B2* | 9/2014 | Marshall | ................. | G01W 1/10 702/3 |

* cited by examiner

*Primary Examiner* — An H Do
(74) *Attorney, Agent, or Firm* — Genius Patent APC; Bruce Hare

(57) ABSTRACT

A method for analyzing signal irregularity of radiation in a lightning leader is provided, which relates to a field of lightning signal processing and includes: S1: acquiring electric field signals; S2: dividing the electric field signals into multiple segments according to time, and calculating an average sample entropy value of each segment of the electric field signals; S3: dividing the multiple segments of electric field signals into three regions according to the time, quantifying irregularity of radiation of the three regions in the leader according to sample entropies and performing classification based on numerical variation characteristics of the irregularity; S4: comparing the classified data with lightning positioning data to form an analysis database; and S5: acquiring real-time electric field signals, calculating average sample entropy values of the electric field signals, and predicting development characteristics of irregular radiation in the lightning leader.

2 Claims, 1 Drawing Sheet

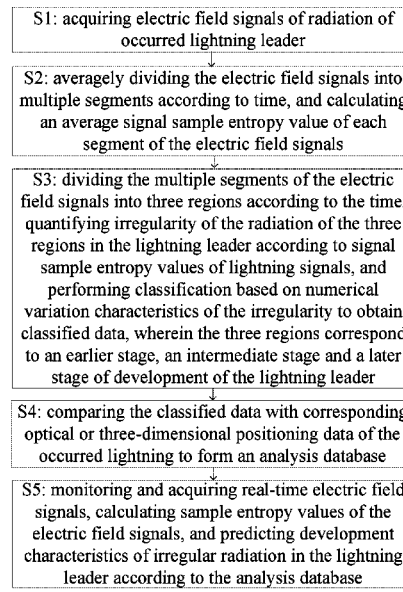

S1: acquiring electric field signals of radiation of occurred lightning leader

↓

S2: averagely dividing the electric field signals into multiple segments according to time, and calculating an average signal sample entropy value of each segment of the electric field signals

↓

S3: dividing the multiple segments of the electric field signals into three regions according to the time, quantifying irregularity of the radiation of the three regions in the lightning leader according to signal sample entropy values of lightning signals, and performing classification based on numerical variation characteristics of the irregularity to obtain classified data, wherein the three regions correspond to an earlier stage, an intermediate stage and a later stage of development of the lightning leader

↓

S4: comparing the classified data with corresponding optical or three-dimensional positioning data of the occurred lightning to form an analysis database

↓

S5: monitoring and acquiring real-time electric field signals, calculating sample entropy values of the electric field signals, and predicting development characteristics of irregular radiation in the lightning leader according to the analysis database

METHOD FOR ANALYZING SIGNAL IRREGULARITY OF RADIATION IN LIGHTNING LEADER

CROSS REFERENCE TO RELATED APPLICATION

This patent application claims the benefit and priority of Chinese Patent Application No. 202111205567.9, entitled "METHOD FOR ANALYZING SIGNAL IRREGULARITY OF RADIATION IN LIGHTNING LEADER" filed on Oct. 15, 2021, the disclosure of which is incorporated by reference herein in its entirety as part of the present application.

TECHNICAL FIELD

The present disclosure relates to the field of lightning signal processing, and particularly relates to a method for analyzing signal irregularity of radiation in a lightning leader.

BACKGROUND ART

Lightning, as one of serious major natural disasters, can cause forest and oil depot fires and cause failure or damage of power supply and communication information systems, and has a major threat to aerospace, mining and some important and sensitive high-tech equipment. After 1980s, the damage caused by the lightning has increased significantly, especially in the fields closely related to high technologies, such as aerospace, national defense, communication, electric power, computer and electronic industry. Due to a wide application of large-scale and super-large-scale integrated circuits that are extremely sensitive to lightning electromagnetic interference, a probability of being struck by the lightning is greatly increased. According to conservative estimates, direct economic losses caused by lightning damage in China exceed hundreds of millions of yuan each year, and indirect economic losses and impacts caused by this are difficult to estimate. Therefore, it is very important to study transmission characteristics of the lightning, such as irregular radiation characteristics of a lightning leader.

When studying Chaotic Pulse Trains (CPT) of leader radiation, researchers usually study power spectral density of signals. However, the power spectral density characterizes a global variable, which cannot fully characterize changes of the signal irregularity. The changes of the signal irregularity may correspond to different development characteristics of the lightning leader. At present, there are still many problems in the research on the development characteristics of the leader with the irregular radiation characteristic, there is no uniform measure for the irregularity of irregular signals, and a quantification scheme of the irregularity of the signals and corresponding research on development of the spatiotemporal characteristics of the lightning leader need to be solved by new technologies.

Entropy represents a degree of chaos, is a total amount of internal disordered structures, and can characterize physical instability of a system. The larger the entropy value is, the more random or irregular the sequence is, and the smaller the entropy value is, the more regular the signal in the sequence is. As a tool for processing complex signals, the entropy is first proposed by Clausius and used to characterize chaotic signals, and subsequently, an approximate entropy and a sample entropy are successively used in time sequence analysis. Since the approximate entropy needs to compare its own data segments and depends on a data length, the sample entropy can be used to quantify the irregularity of lightning signals.

SUMMARY

In order to solve the above problems, the present disclosure intends to design a method for analyzing a signal irregularity of radiation in a lightning leader.

The above effect of the present disclosure is realized through the following technical solutions.

The method for analyzing the signal irregularity of the radiation in the lightning leader includes:

S1: acquiring electric field signals of radiation of occurred lightning leader;

S2: averagely dividing the electric field signals into multiple segments according to time, and calculating an average signal sample entropy value of each segment of the electric field signals;

S3: dividing the multiple segments of the electric field signals into three regions according to the time, quantifying irregularity of the radiation of the three regions in the lightning leader according to signal sample entropy values of lightning signals, and performing classification based on numerical variation characteristics of the irregularity to obtain classified data, where the three regions correspond to an earlier stage, an intermediate stage and a later stage of development of the lightning leader;

S4: comparing the classified data with corresponding optical or three-dimensional positioning data of the occurred lightning to form an analysis database; and S5: monitoring and acquiring real-time electric field signals, calculating sample entropy values of the electric field signals, and predicting development characteristics of irregular radiation in the lightning leader according to the analysis database.

The present disclosure has the following beneficial effects: the signal sample entropies are introduced to quantify the irregularity of the electric field signals of the radiation in the lightning leader, classification is performed according to numerical variation characteristics of the irregularity to establish the analysis database, thereby achieving analysis and prediction of the development characteristics of the irregular radiation in the lightning leader only based on lightning electric field data in the case of insufficient experimental devices.

BRIEF DESCRIPTION OF THE DRAWINGS

FIG. 1 is a flow diagram of a method for analyzing signal irregularity of radiation in a lightning leader in the present disclosure.

DETAILED DESCRIPTION OF THE EMBODIMENTS

To make the objectives, technical solutions and advantages of the embodiments of the present disclosure clearer, the technical solutions in the embodiments of the present disclosure are clearly and completely described below with reference to the accompanying drawings in the embodiments of the present disclosure. Apparently, the described embodiments are merely some rather than all of the embodiments of the present disclosure. Generally, components of the embodiments of the present disclosure described and shown in the accompanying drawings may be arranged and designed in various configurations.

Therefore, the following detailed description of the embodiments of the present disclosure in the accompanying drawings is not intended to limit the scope of the present disclosure, but merely indicates selected embodiments of the present disclosure. All other embodiments obtained by a person of ordinary skill in the art based on the embodiments of the present disclosure without creative efforts shall fall within the scope of the present disclosure.

It should be noted that similar reference signs and letters represent similar items in the accompanying drawings below. Therefore, once an item is defined in one drawing, it does not need to be further defined and described in subsequent drawings.

In the description of the present disclosure, it should be understood that orientation or position relationships indicated by terms "upper", "lower", "inner", "outer", "left", "right", etc. are orientation or position relationships shown in the accompanying drawings, or the usual orientation or position relationships of the products of the present disclosure when in use, or orientation or position relationships commonly understood by those skilled in the art. These terms are only used to facilitate the description of the present disclosure and simplify the description, but not to indicate or imply that the mentioned devices or components must have a specific orientation or must be constructed and operated in a specific orientation, and thus these terms cannot be understood as a limitation to the present disclosure.

In addition, the terms such as "first" and "second" are used only for the purpose of description and cannot be understood to indicate or imply relative importance.

In the description of the present disclosure, it should be noted that, unless otherwise clearly specified and limited, meanings of terms "disposed", "connected", etc. should be understood in a board sense. For example, "connection" may be a fixed connection, a removable connection, or an integral connection; may be a mechanical connection or an electrical connection; may be a direct connection or an indirect connection through an intermediate medium; or may be intercommunication between two components. Those of ordinary skill in the art may understand specific meanings of the above terms in the present disclosure based on specific situations.

The specific implementations of the present disclosure will be described below in detail with reference to the accompanying drawings.

As shown in FIG. 1, a method for analyzing signal irregularity of radiation in a lightning leader includes S1-S5.

S1: Electric field signals of radiation of the occurred lightning leader are acquired.

S2: The electric field signals are averagely divided into 10 segments according to time, and an average signal sample entropy value of each segment of the electric field signals is calculated, specifically including:

S21: Each segment of the electric field signals is set as {X(i), i=1,2, ..., n}, where n represents the number of data points;

S22: Each segment of the electric field signals is divided into k=n−m+1 signal sequences with m taken as a window, and each of the signal sequences is set as $X_i(t)=(x_i(t), x_{i+1}(t), \ldots, x_{i+m-1}(t))$;

S23: A distance $d_{ij}$ between each of the signal sequences and all k signal sequences is calculated, where the distance $d_{ij}$ between X(i) and X(j) is a maximum difference between corresponding elements of X(i) and X(j), that is, $d_{ij}=\max\{x_{i+k}(t)-x_{j+k}(t)\}$, and k=0,1, ..., m−1;

S24: For each i value, the number of $d_{ij}$ greater than r and a ratio of this number to n-m, denoted as $c_i^m(t)$, are counted, and an average value $$\phi^m(t) = \frac{1}{n-m} \sum_{i=1}^{n-m} c_i^m(t)$$

is calculated according to k of $c_i^m(t)$, where F=r*SD, r represents a coefficient with a range of 0.1-0.25, and SD represents a standard deviation of the sequence;

S25: The window m is increased to m+1, S22 to S24 are repeated, and then, S26 is performed;

S26: A sample entropy value $SampEn(t)=\ln\phi^m(t)-\ln\phi^{m+1}(t)$ of this segment of the electric field signals is determined.

S3: Multiple segments of the electric field signals are divided into three regions of segments 1 to 3, segments 4 to 7 and segments 6 to 10 according to the time, namely an earlier stage, an intermediate stage and a later stage of development of the lightning respectively, irregularity of the radiation of the three regions in the lightning leader is quantified according to signal sample entropy values of lightning signals, classification is performed based on numerical variation characteristics of the irregularity to obtain classified data.

S4: The classified data is compared with corresponding optical or three-dimensional positioning data of the occurred lightning to form an analysis database.

S5: Real-time electric field signals are monitored and acquired, sample entropy values of the electric field signals are calculated, and development characteristics of irregular radiation in the lightning leader are predicted according to the analysis database.

The technical solutions of the present disclosure are not limited to the above specific embodiments, and all technical modifications made according to the technical solutions of the present disclosure fall within the scope of the present disclosure.

What is claimed is:

1. A method for analyzing signal irregularity of radiation in a lightning leader, comprising:
   S1: acquiring electric field signals of radiation of occurred lightning leader;
   S2: averagely dividing the electric field signals into multiple segments according to time, and calculating an average signal sample entropy value of each segment of the electric field signals by:
   S21: setting each segment of the electric field signals as {X(i), i=1,2, ..., n}, wherein n represents a number of data points;
   S22: dividing each segment of the electric field signals into k=n−m+1 signal sequences with m taken as a window, and setting eah of the signal sequences as $X_i(t)=(x_i(t), x_{i+1}(t), \ldots, x_{i+m-1}(t))$;
   S23: calculating a distance $d_{ij}$ between each of the signal sequences and all k signal sequences, wherein the distance $d_{ij}$ between X(i) and X(j) is a maximum difference between corresponnding elements of X(i) and X(j), which is denoted as $d_{ij}=\max\{x_{i+k}(t)-x_{j+k}(t)\}$, and k=0,1, ..., m−1;
   S24: for each i value, counting a number of $d_{ij}$ greater than r and a ratio of this number to a total number n−m that does not include itself, denoted as $c_i^m(t)$, and calculating an average value $$\phi^m(t) = \frac{1}{n-m} \sum_{i=1}^{n-m} c_i^m(t)$$

according to k of $c_i^m(t)$, wherein
F=r*SD, r represents a coefficient with a range of 0.1–0.25, and SD represents a standard deviation of the sequence;

S25: increasing the window m to m−1, repeating S22 to S24, and then, performing S26; and S26: determining a sample entropy value SampEn(t) =ln$\Phi^m$(t)−ln$\Phi^{m+1}$(t) of this segment of the electric field signals;

S3: dividing the multiple segments of the electric field signals into three regions according to the time, quantifying irregularity of the radiation of the three regions in the lightning leader according to signal sample entropy values of lightning signals, and performing classification based on numerical variation characteristics of the irregularity to obtain classified data, wherein the three regions correspond to an earlier stage, an intermediate stage and a later stage of development of the lightning leader;

S4: comparing the classified data with corresponding optical or three-dimensional positioning data of the occurred lightning to form an analysis database;

S5: monitoring and acquiring real-time electric field signals, calculating sample entropy values of the electric field signals, and predicting development characteristics of irregular radiation in the lightning leader according to the analysis database; and S6: controlling integrated circuits to avoid being struck by lightning according to the predicted development characteristics of irregular radiaiton in the lighting leader.

2. The method for analyzing the signal irregularity of the radiation in the lightning leader according to claim 1, wherein in S2, the electric field signals are averagely divided into 10 segments according to the time, and in S3, the earlier stage, the intermediate stage and the later stage of the development of the lightning correspond to segments 1 to 3, segments 4 to 7 and segments 6 to 10 respectively.

\* \* \* \* \*